United States Patent Office 3,299,074
Patented Jan. 17, 1967

---

3,299,074
MANUFACTURE OF ORGANIC BASES
Ian Campbell, Widnes, England, assignor to Imperial Chemical Industries Limited, London, England, a corporation of Great Britain
No Drawing. Filed July 2, 1964, Ser. No. 380,050
Claims priority, application Great Britain, July 19, 1963, 28,719/63
11 Claims. (Cl. 260—290)

This invention relates to a process for the manufacture of organic bases, and more particularly to a catalytic process for the manufacture of pyridine or substituted pyridines.

Processes have previously been disclosed whereby the interaction of ammonia and an ether of 2-hydroxy-3,4-dihydro-2H-pyran or an alkylated derivative thereof yields pyridine or an alkylated pyridine. In the previously known processes the reaction has been carried out in the vapour phase in the presence of a solid catalyst comprising activated alumina, with or without oxides of polyvalent metals such as chromium oxide and copper oxide, and with or without alkali metal sulphates such as sodium sulphate or potassium sulphate.

It has now been found that the reaction may be carried out very conveniently and efficiently using a noble metal catalyst.

Thus according to this invention there is provided a process for the manufacture of pyridine or substituted pyridines which comprises interacting an ether of 2-hydroxy-3,4-dihydro-2H-pyran or of a substituted derivative of 2-hydroxy-3,4-dihydro-2H-pyran with ammonia in the vapour phase at an elevated temperature in the presence of a catalyst comprising a noble metal.

The ethers of 2-hydroxy-3,4-dihydro-2H-pyran or substituted derivatives thereof suitable for use as starting materials include the ethers of alkylated derivatives, for example the ethers represented by the general formula:

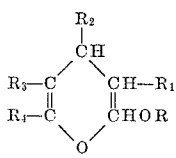

wherein each of $R_1$, $R_2$, $R_3$ and $R_4$ represents a hydrogen atom or an alkyl radical, and may be the same or different, and wherein R represents an etherifying group.

When any of groups $R_1$, $R_2$, $R_3$ and $R_4$ represents an alkyl radical, it is preferred that this should be a methyl or ethyl radical.

The etherifying group R may be an alkyl radical or an aliphatic hydrocarbon chain interrupted by one or more oxygen atoms, as for example an alkoxyalkyl radical or a radical derived from an ether of a polyalkylene glycol.

It is preferred to use as starting materials those ethers which have adequate volatility to allow the vapour phase reaction to be carried out conveniently and to provide an adequate concentration of the ether in the reaction mixture. Thus it is preferred that the group R should contain not more than four carbon atoms, although it may contain more if desired. It is also preferred that the molecule of the ether should contain not more than eleven carbon atoms, although it may contain more if desired.

The ethers may be made, for example, by interacting a vinyl alkyl ether with an α,β-unsaturated aldehyde. The vinyl alkyl ether may be made, for example, from acetylene and a hydroxy compound, ROH.

Suitable catalysts contain the noble metal in finely divided form on a carrier or support. Suitable support materials are for example those consisting essentially of silica, alumina or a mixture or combination thereof. An especially suitable support material is a microspheroidal silica-alumina with physical characteristics appropriate to fluidised bed operation.

Conveniently, the catalyst may contain up to 5% by weight of the noble metal, but it is preferred to use from 0.1% to 0.5%. The preferred noble metals for this purpose are palladium and platinum. The use of platinum is especially preferred as this metal gives outstandingly high conversion of the pyran into pyridine or substituted pyridines. When other noble metals, for example silver, gold, ruthenium, and iridium are used, somewhat lower conversions are obtained than when palladium is used.

The catalyst may be prepared in conventional manner, for example by impregnating the support material with the metal chloride, followed by reduction of the metal chloride to the metal.

The relative proportions of ammonia and the ether of the 2-hydroxy-3,4-dihydro-2H-pyran may suitably be between 1 and 20 moles of ammonia for each mole of the ether, preferably between 4 and 10 moles of ammonia for each mole of the ether. There may also be present diluent gases or vapours; these may be either inorganic, for example nitrogen, hydrogen and steam, or organic, for example alkanols. It is preferred to use steam as diluent in the proportions of between 5 and 25 moles of steam per mole of the ether. Conveniently, ammonia may be fed into a gas stream containing the vapourised ether and the mixture passed into the catalyst bed.

Suitable temperatures at which the bed of catalyst may be maintained during reaction are those in the range from 200° C. to 500° C., preferably between 250° C. and 350° C.

It is usually convenient to operate the process at substantially atmospheric pressure, any excess pressure above atmospheric being for the purpose of promoting flow of gas through the reactor and ancillary apparatus. Higher or lower pressures may be used if desired however.

The rate of flow of the said gas mixture is usually such as to give a contact time between 1 and 20 seconds with the catalyst.

Pyridine or substituted pyridines may be isolated from the gases emerging from the catalyst bed by conventional means, for example by condensation, scrubbing with water or acid, treatment with caustic alkali, extraction with non-aqueous solvents, fractional distillation, or combination of such techniques. Unreacted ammonia and unreacted starting material remaining after extraction of the desired product may, if desired, be recycled to the gas mixture fed into the catalyst zone. The alcohol ROH arising from the ether side-chain may be recovered and, if desired, re-used.

Pyridine or substituted pyridines isolated from the product may be converted into valuable pyridine derivatives, for example bipyridyls which are useful as intermediates for chemical snythesis and for the manufacture of herbicidal materials.

The process produces a high yield of pyridine bases and has the additional advantage of producing relatively little "coke" or carbonaceous waste in the reaction zone. The activity and selectivity of the catalyst are maintained during prolonged periods of continuous operation. Carbonaceous waste may be removed, and the catalyst restored to its original level of activity, by heating in a stream of air at 400° C. to 500° C.

The invention is illustrated but not limited by the following examples. All parts are by weight.

Example 1

The support material used was a microspheroidal silica-alumina, available commercially under the trade name "Synclyst MS/13/HS," containing 13.0% $Al_2O_3$ and 86.8% $SiO_2$.

One part of palladium chloride was dissolved in a mixture of 2.2 parts of ammonia (specific gravity 0.88) and 240 parts of distilled water. The solution was added with stirring to 200 parts of the silica-alumina support and the mixture was dried at 110° C. for 16 hours, followed by heating in air at 350° C. for 4 hours. The dried product was fluidised and subjected to reduction at 500° C. in a gas stream consisting of hydrogen and steam in equimolar proportions. The catalyst, after reduction, contained 0.30% by weight of palladium and less than 0.02% chlorine as Cl.

Vapourised 2-ethoxy-3,4-dihydro-2H-pyran was mixed continuously with ammonia and steam to give a mixture containing 5 moles of ammonia and 20 moles of steam for each mole of the pyran. The mixture was passed through a fluidised bed of 110 grams of the catalyst prepared as described above, the temperature of the catalyst bed being maintained at 300° C. The flow-rate of the gas mixture was such that the contact time was 7.5 seconds. The flow-rate of the pyran was 0.20 mole per hour.

The flow was continued for 16 hours, during which time the average molar conversion of the pyran into pyridine was 66%.

Example 2

The support material used was a microspheroidal silica-alumina, available commercially under the trade name "Synclyst MS/25 grade 68," containing 25% $Al_2O_3$ and 74% $SiO_2$.

One part of ammonium chloroaurate was dissolved in 300 parts of distilled water and the solution was added with stirring to 200 parts of the silica-alumina support. The mixture was dried in air at 110° C. for 12 hours and the residue was subjected to reduction at 400° C. for 6 hours in a gas stream consisting of hydrogen and steam in equimolar proportions.

Vaporised 2-isobutoxy-3,4-dihydro-2H-pyran was mixed continuously with ammonia and steam to give a mixture containing 5 moles of ammonia and 10 moles of steam for each mole of the pyran. The mixture was passed through a fluidised bed of 103 grams of the gold catalyst prepared as described above, the temperature of the catalyst bed being maintained at 270–300° C. The flow-rate of the gas mixture was such that the contact time was 7.5 seconds. The flow-rate of the pyran was 0.19 mole per hour.

The flow was continued for 12 hours, during which time the average molar conversion of the pyran into pyridine was 42%.

Example 3

The support material used was a microspheroidal silica-alumina, available commercially under the trade name "Synclyst MS/13 grade 73" containing 13.0% $Al_2O_3$ and 86.8% $SiO_2$.

1.2 parts of silver nitrate were dissolved in 420 parts of distilled water and the solution was added with stirring to 300 parts of the silica-alumina support. Drying, followed by reduction, was carried out as described in Example 2.

The silver catalyst was used to carry out the reaction between 2-isobutoxy-3,4-dihydro-2H-pyran and ammonia in the presence of steam under the conditions described in Example 2 except that the reaction temperature was 300° C.

The flow was continued for 12 hours, during which time the average molar conversion of the pyran into pyridine was 48%.

Example 4

One part of ammonium chloroiridite was dissolved in 240 parts of distilled water and the solution was added with stirring to 160 parts of the silica-alumina support described in Example 2 except that the reaction tempera- was carried out as described in Example 2.

The iridium catalyst was used to carry out the reaction between 2-isobutoxy-3,4-dihydro-2H-pyran and ammonia in the presence of steam under the conditions described in Example 1 except that the reaction temperature was 250° C. to 350° C.

The flow was continued for 12 hours, during which time the average molar conversion of the pyran into pyridine was 42%.

Example 5

One part of ammonium chlororuthenate was dissolved in 270 parts of distilled water and the solution was added with stirring to 172 parts of the silica-alumina described in Example 3. Drying, followed by reduction, was carried out as described in Example 2.

The ruthenium catalyst was used to carry out the reaction between 2-isobutoxy-3,4-dihydro-2H-pyran and ammonia in the presence of steam under the conditions described in Example 2 except that the reaction temperature was 300° C.

The flow was continued for 12 hours, during which time the average molar conversion of the pyran into pyridine was 63%.

Example 6

One part of chloroplatinic acid was dissolved in 270 parts of distilled water and the solution was added with stirring to 160 parts of the silica-alumina support described in Example 2. Drying, followed by reduction, was carried out as described in Example 2.

The platinum catalyst was used to carry out the reaction between 2-isobutoxy-3,4-dihydro-2H-pyran and ammonia in the presence of steam under the conditions described in Example 2 except that the reaction temperature was 300° C.

The flow was continued for 12 hours, during which time the average molar conversion of the pyran into pyridine was 72%.

Example 7

A catalyst comprising platinum of silica-alumina was prepared as described in Example 6. The catalyst was used to carry out the reaction between 2-isobutoxy-3,4-dihydro-2H-pyran and ammonia in the presence of steam under the conditions described in Example 6 except that 206 grams of the platinum catalyst were used and the temperature of the catalyst bed was maintained at 300° C.

The flow was continued for 127 hours, during which time the average molar conversion of the pyran into pyridine was 68%; the molar conversion was substantially constant over the whole of this period.

Example 8

Vaporised 2-isobutoxy-3,4-dihydro-2H-pyran was mixed continuously with ammonia and hydrogen to give a mixture containing 5 moles of ammonia and 10 moles of hydrogen for each mole of the pyran. The mixture was passed through a fluidised bed of 103 grams of a platinum catalyst prepared as described in Example 6, the temperature of the catalyst bed being maintained at 300° C. The flow-rate of the pyran was 0.20 mole per hour.

The flow was continued for 20 hours, during which time the average molar conversion of the pyran into pyridine was 48%.

Example 9

Vaporised 2-isobutoxy-3,4-dihydro-2H-pyran was mixed continuously with ammonia and isobutanol vapour to give a mixture containing 5 moles of ammonia and 10 moles of isobutanol for each mole of the pyran. The mixture was passed through a bed of 103 grams of a platinum catalyst prepared as described in Example 6, the temperature of the catalyst bed being maintained at 300° C. The flow-rate of the pyran was 0.20 mole per hour.

The flow was continued for 12 hours, during which time the average molar conversion of the pyran into pyridine was 51%.

*Example 10*

The support material used was "Actal A" alumina, 4-8 B.S.S. mesh. ("Actal" is a trade name.")

One part of chloroplatinic acid was dissolved in 270 parts of distilled water and the solution was added with stirring to 160 parts of the alumina support. The mixture was evaporated to dryness and the residue was subjected to reduction as described in Example 2.

The catalyst was used to carry out the reaction between 2-isobutoxy-3,4-dihydro-2H-pyran and ammonia in the presence of steam under the conditions described in Example 2 except that a fixed bed of the platinum/alumina catalyst was used at 300° C.

The flow was continued for 12 hours, during which time the average molar conversion of the pyran into pyridine was 75%.

*Example 11*

Crude 2-ethoxy-4-methyl-3,4-dihydro-2H-pyran (approximately 80% pure) was prepared by condensation of crotonaldehyde with ethyl vinyl ether.

The crude product was vaporised and mixed continuously with ammonia and steam to give a mixture containing 5 moles of ammonia and 10 moles of steam for each mole of crude pyran. The mixture was passed through a fluidised bed of 103 grams of a platinum catalyst prepared as described in Example 6, the temperature of the catalyst bed being maintained at 300° C. The flow rate of the crude pyran was 0.20 mole per hour.

The flow was continued for 15 hours, during which time the average molar conversion of the pyran into 4-methylpyridine was 69% (calculated on the assumption that the pyran in the feed was 80% pure).

What is claimed is:

1. A process for the production of a member selected from the group consisting of pyridine and lower alkyl substituted derivatives thereof which comprises reacting a member selected from the group consisting of a lower alkyl ether of 2-hydroxy-3,4-dihydro-2H-pyran and lower alkyl substituted derivatives thereof with between about 1-20 moles of ammonia per mole of said ether and a diluent selected from the group consisting of nitrogen, hydrogen, steam, and alkanols, in the vapor phase at a temperature in the range 200°-500° C. and in the presence of a catalyst consisting essentially of a noble metal deposited on a support selected from the group consisting of silica, alumina, and mixtures and combinations thereof.

2. A process as claimed in claim 1 wherein the noble metal is in finely divided form and is deposited upon said support.

3. A process as claimed in claim 1 wherein the catalyst contains up to 5% by weight of the noble metal.

4. A process as claimed in claim 3 wherein the catalyst contains from 0.1% to 0.5% by weight of the noble metal.

5. A process as claimed in claim 1 wherein the noble metal is platinum.

6. A process as claimed in claim 1 wherein the noble metal is palladium.

7. A process as claimed in claim 1 wherein the lower alkyl substituents of the pyran ring are selected from the class consisting of methyl and ethyl.

8. A process as claimed in claim 1 wherein the molecule of the ether contains not more than 11 carbon atoms.

9. A process as claimed in claim 1 wherein the reaction mixture contains between 4 and 10 moles of ammonia per mole of the ether.

10. A process as claimed in claim 1 wherein the reaction mixture contains between 5 and 25 moles of steam per mole of the ether.

11. A process as claimed in claim 1 wherein the reaction is carried out at a temperature in the range 250° C. to 350° C.

References Cited by the Examiner

UNITED STATES PATENTS 2,706,208  4/1955  Pines et al. _____ 260—696 XR
2,741,618  4/1956  Young _____ 260—290

WALTER A. MODANCE, *Primary Examiner.*

A. L. ROTMAN, *Assistant Examiner.*